(12) United States Patent
Kowerchuk et al.

(10) Patent No.: US 9,285,064 B2
(45) Date of Patent: Mar. 15, 2016

(54) COUPLING SAFETY APPARATUS FOR A LEVER ACTIVATED VALVE

(71) Applicants: Ron Kowerchuk, Maidstone (CA); Kary Martiniuk, Maidstone (CA)

(72) Inventors: Ron Kowerchuk, Maidstone (CA); Kary Martiniuk, Maidstone (CA)

(*) Notice: Subject to any disclaimer, the term of this patent is extended or adjusted under 35 U.S.C. 154(b) by 190 days.

(21) Appl. No.: 13/950,977

(22) Filed: Jul. 25, 2013

(65) Prior Publication Data
US 2014/0026966 A1 Jan. 30, 2014

(30) Foreign Application Priority Data

Jul. 25, 2012 (CA) ..................... 2783579

(51) Int. Cl.
F16L 35/00 (2006.01)
F16L 55/00 (2006.01)
F16L 37/18 (2006.01)
F16L 55/10 (2006.01)

(52) U.S. Cl.
CPC ................. *F16L 55/00* (2013.01); *F16L 35/00* (2013.01); *F16L 37/18* (2013.01); *F16L 55/10* (2013.01); *Y10T 137/0318* (2015.04); *Y10T 137/7043* (2015.04)

(58) Field of Classification Search
CPC .................................. F16L 35/00; F16L 37/18
USPC ......... 285/80, 81, 87, 88; 137/377; 251/149.9
See application file for complete search history.

(56) References Cited

U.S. PATENT DOCUMENTS

| 1,887,677 | A | * | 11/1932 | Gamble | 251/215 |
| 4,103,712 | A | * | 8/1978 | Fletcher et al. | 137/637.05 |
| 4,397,332 | A | * | 8/1983 | Sample | 137/385 |
| 4,515,182 | A | * | 5/1985 | LeDevehat | 137/614.06 |
| 4,982,929 | A | | 1/1991 | Spurling | |
| 6,736,367 | B2 | | 5/2004 | Scobie | |
| 8,074,959 | B2 | * | 12/2011 | Sledz | 251/89.5 |
| 8,132,781 | B2 | * | 3/2012 | Haunhorst | 251/149.9 |

* cited by examiner

Primary Examiner — Kevin Murphy
(74) Attorney, Agent, or Firm — Davis & Bujold PLLC; Michael J. Bujold

(57) ABSTRACT

A safety apparatus for a lever activated valve having a tubular outlet to which a hose is coupled, a valve member and a lever secured to the valve member which pivots to move the valve member between a valve open and valve closed position. The safety apparatus includes a support having a clamp adapted for attachment to a tubular outlet of a lever activated valve. A shroud is pivotally mounted to the support for movement between an operative position overlying the tubular outlet to prevent access to cam lock coupling ears and an inoperative position spaced from the tubular outlet. A lever cradle is provided on the shroud. The lever engages the lever cradle of the shroud when the lever position is pivoted to move the valve member to the valve open position, so that the shroud is held in the operative position by the lever.

5 Claims, 3 Drawing Sheets

COUPLING SAFETY APPARATUS FOR A LEVER ACTIVATED VALVE

FIELD

There is described a coupling safety apparatus which prevents a hose from becoming detached from a lever activated valve as a result of human error.

BACKGROUND

It was formerly not possible to lock the ears of a cam lock hose coupling. With non-locking ears there was always a danger that the ears would work loose due to vibration, while the valve was still open, decoupling the hose. Apparatus were developed to prevent decoupling from happening, such as U.S. Pat. No. 4,982,929 (Spurling). When locking ears were introduced on cam lock hose couplings, the problem of decoupling due to vibration was resolved. Unfortunately, accidents are still occurring due to human error. U.S. Pat. No. 6,736,367 (Scobie) is an example of an apparatus which was developed to prevent accidents due to human error with wheel activated gate valves. There is a need for a coupling safety apparatus that will prevent accidents due to human error with lever activated valves.

SUMMARY

According to one aspect there is provided a safety apparatus for a lever activated valve. The type of lever activated valve to which this safety apparatus is applicable having a tubular outlet to which a hose is coupled, a valve member and a lever secured to the valve member which pivots to move the valve member between a valve open and valve closed position. The safety apparatus includes a support having a clamp adapted for attachment to a tubular outlet of a lever activated valve. A shroud is pivotally mounted to the support for movement between an operative position overlying the tubular outlet to prevent access to cam lock coupling ears and an inoperative position spaced from the tubular outlet. A lever cradle is provided on the shroud. The lever engages the lever cradle of the shroud when the lever position is pivoted to move the valve member to the valve open position, so that the shroud is held in the operative position by the lever.

According to another aspect there is a method that uses the safety apparatus described above. A first step is taken of clamping the clamp onto the tubular outlet of the lever activated valve. A second step is taken of pivotally mounting the shroud to the support for movement between an operative position overlying the tubular outlet to prevent access to cam lock coupling ears and an inoperative position spaced from the tubular outlet enabling access to the cam lock coupling ears. A third step is taken of attaching ears of the cam lock coupling to the tubular outlet. A fourth step is then taken of pivoting the lever to move the valve open position. The lever engages the lever cradle of the shroud. The shroud is maintained in the operative position by the lever to prevent access to the cam lock coupling as long as the valve member remains pivoted to maintain the valve member in the valve open position.

BRIEF DESCRIPTION OF THE DRAWINGS

These and other features will become more apparent from the following description in which reference is made to the appended drawings, the drawings are for the purpose of illustration only and are not intended to be in any way limiting, wherein.

DETAILED DESCRIPTION

Figure 1:
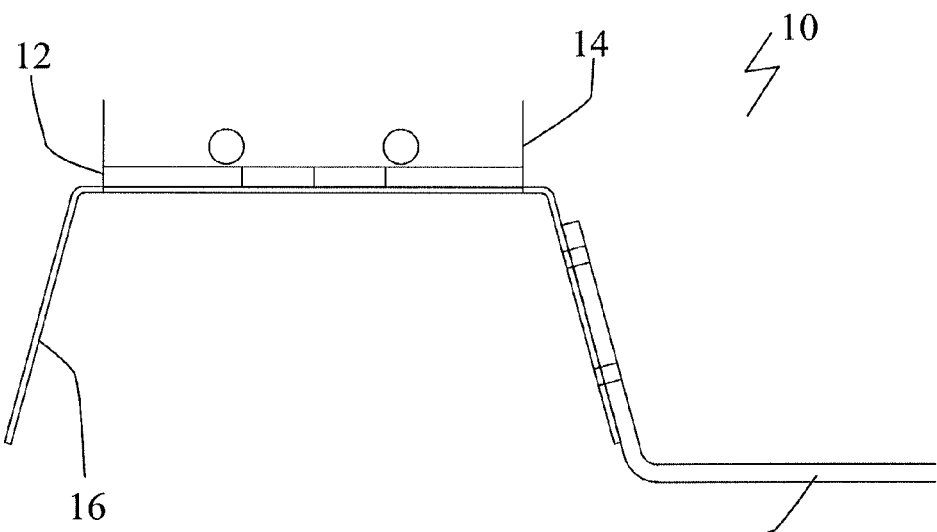
FIG. 1 is a front elevation view of a coupling safety apparatus for a lever activated valve.
Figure 2:
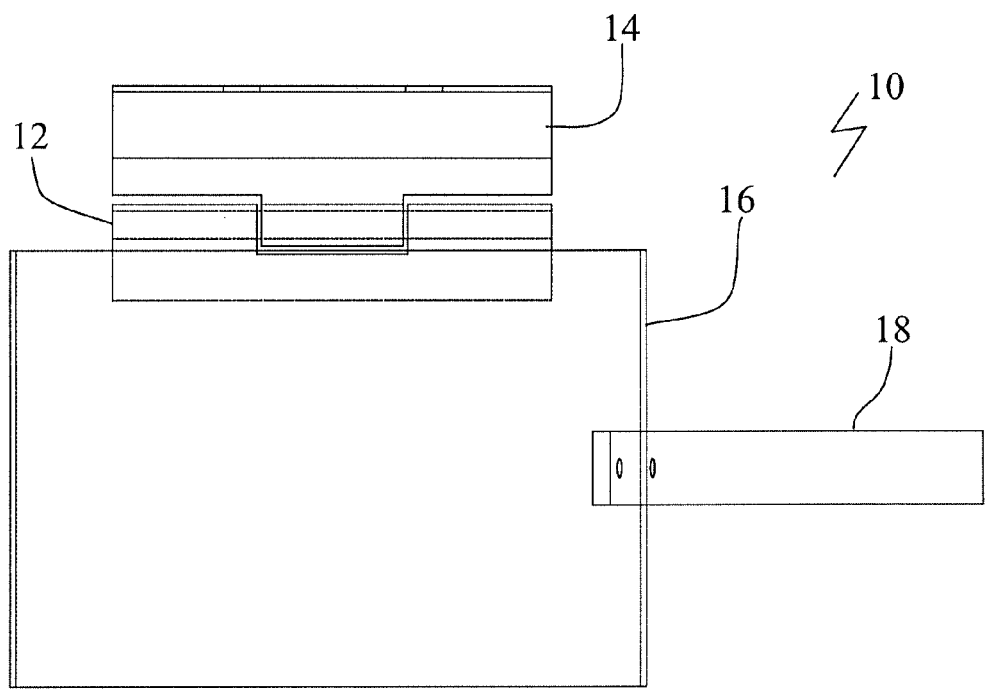
FIG. 2 is a top plan view of the coupling safety apparatus for a lever activated valve shown in FIG. 1.
Figure 3:
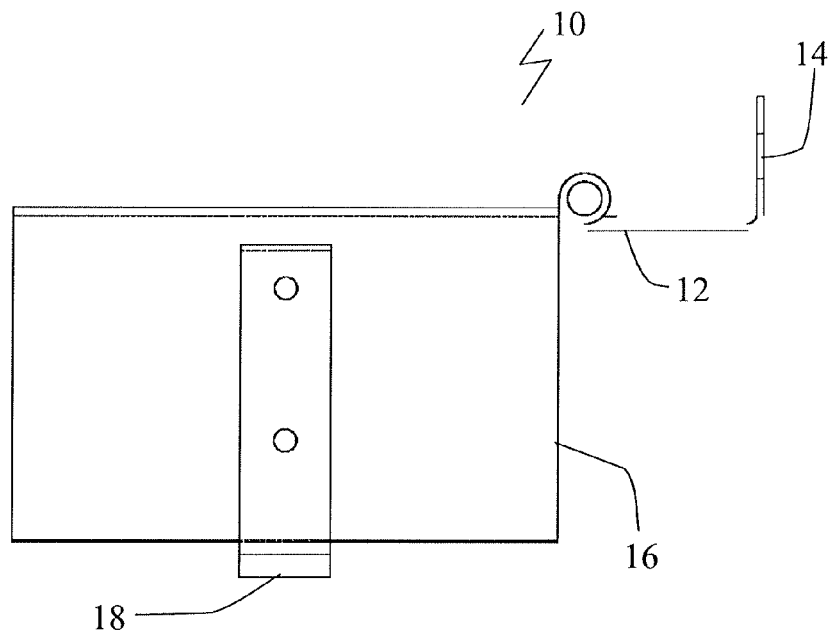
FIG. 3 is a side elevation view of the coupling safety apparatus for a lever activated valve shown in FIG. 1.
Figure 4:
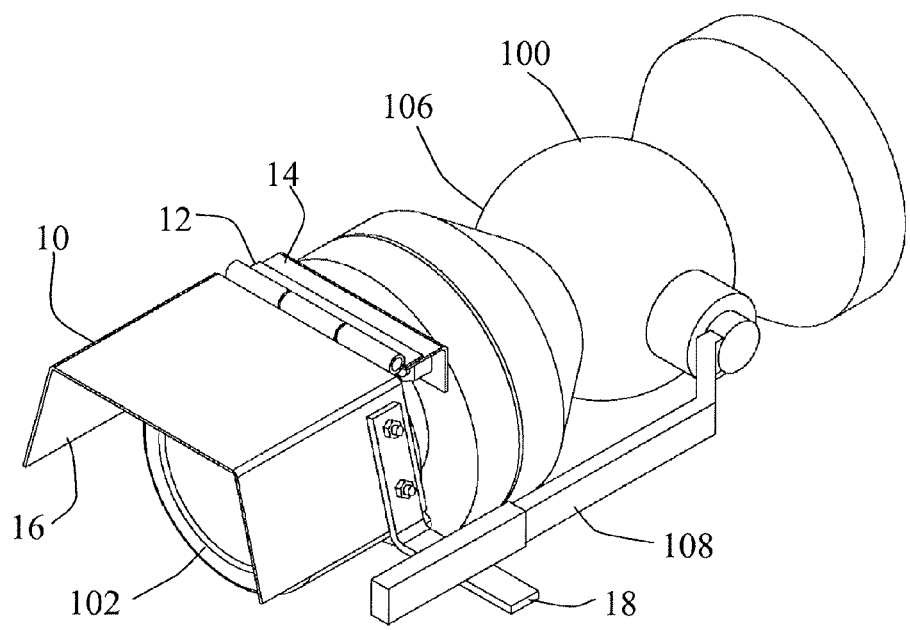
FIG. 4 is a perspective view of the coupling safety apparatus in the operative position on a lever activated valve.
Figure 5:
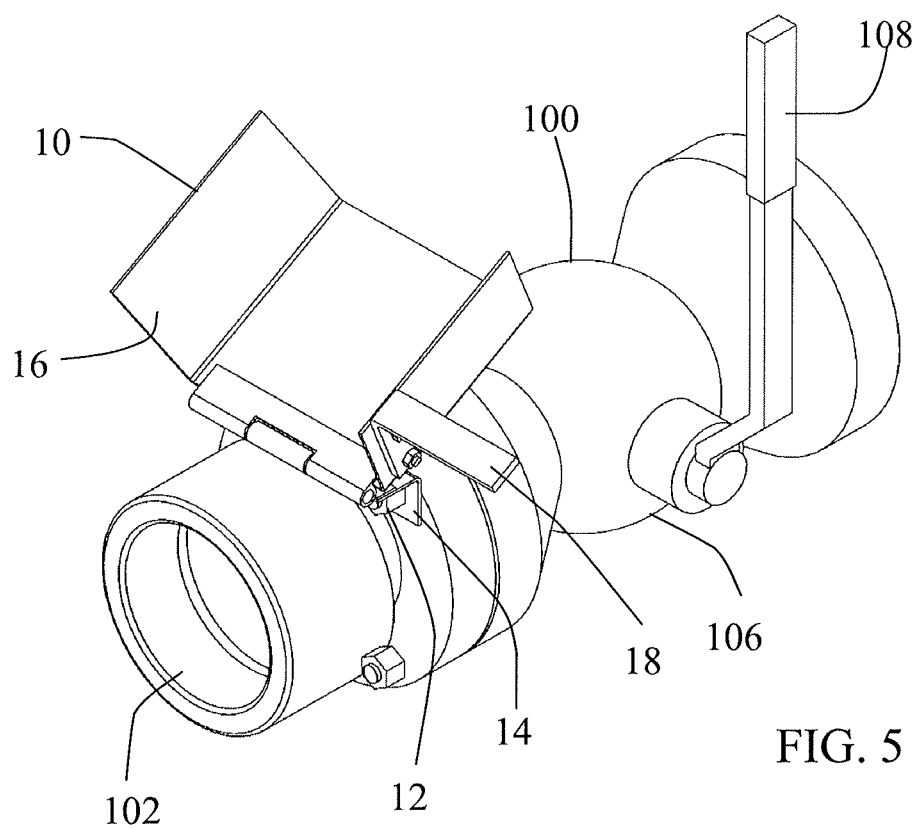
FIG. 5 is a perspective view of the coupling safety apparatus in the inoperative position on a lever activated valve.

A coupling safety apparatus for a lever activated valve generally identified by reference numeral 10, will now be described with reference to FIG. 1 through 5.
Structure and Relationship of Parts:

Referring to FIG. 4 and FIG. 5, a safety apparatus 10 is described for use with a lever activated valve 100 that has a tubular outlet 102 to which a hose, not shown, is coupled. The valve 100 has a valve member 106 and a lever 108 secured to the valve member 106 which pivots to move the valve member 106 between a valve open and valve closed position. Referring to FIG. 1-FIG. 3, the safety apparatus 10 has a support 12 with a clamp 14 adapted for attachment to the tubular outlet 102 of the lever activated valve 100. A shroud 16 is pivotally mounted to the support 12 for movement between an operative position, shown in FIG. 4, overlying the tubular outlet 102 to prevent access to cam lock coupling ears, not shown, and an inoperative position, shown in FIG. 5, spaced from the tubular outlet 102. A lever cradle 18 is positioned on the shroud 16. Referring to FIG. 4, the lever 108 engages the lever cradle 18 of the shroud 16 when the lever 108 is pivoted to move the valve member 106 to the valve open position. The shroud 16 is held in the operative position by the lever 108. Referring to FIG. 5, when the lever 108 is disengaged from the lever cradle 18, the valve member 106 causes the valve 100 to move to the closed position and the shroud 16 can be pivoted to the inoperative position to allow access to the tubular outlet 102.
Operation:

Referring to FIG. 4 and FIG. 5, the clamp 14 is clamped onto the tubular outlet 102 of the lever activated valve 100. The shroud 16 is pivotally mounted to the support 12 for movement between an operative position, shown in FIG. 4, overlying the tubular outlet 102 to prevent access to cam lock coupling ears and an inoperative position, shown in FIG. 5, spaced from the tubular outlet 102 enabling access to the cam lock coupling ears. Referring to FIG. 4, the shroud 16 has a lever cradle 18 in which the lever 108 of the valve 100 rests when the shroud 16 is in the operative position and the valve 100 is in the open position. When the lever 108 is pivoted to move the valve 100 to the open position, the lever 108 engages the lever cradle 18 so that the shroud 16 is maintained in the operative position by the lever 108 to prevent access to the cam lock coupling ears, as long as the valve member 106 remains pivoted to maintain the valve member 106 in the valve open position. Referring to FIG. 5, to allow access to the cam lock coupling ears, the lever 108 must be pivoted to cause the valve 100 to move to the closed position. This causes the lever 108 to be disengaged from the lever cradle 18 and allows the shroud 16 to be pivoted to the inoperative position.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

The following claims are to be understood to include what is specifically illustrated and described above, what is conceptually equivalent, and what can be obviously substituted. Those skilled in the art will appreciate that various adaptations and modifications of the described embodiments can be configured without departing from the scope of the claims. The illustrated embodiments have been set forth only as examples and should not be taken as limiting the invention. It is to be understood that, within the scope of the following claims, the invention may be practiced other than as specifically illustrated and described.

What is claimed is:

1. A safety apparatus, comprising, in combination:
    a lever activated rotary motion valve having a tubular outlet to which a hose is coupled, a valve member and a lever secured to the valve member which pivots about a first pivot axis to move the valve member between a valve open and a valve closed position;
    a support secured to the tubular outlet of the lever activated valve downstream of the valve member; and
    a shroud pivotally mounted to the support about a second pivot axis downstream of the first pivot axis for movement between an operative position overlying the tubular outlet to prevent access to cam lock coupling ears and an inoperative position spaced from the tubular outlet, such that when the lever is pivoted from a lever closed pivotal position to a lever open pivotal position, the lever maintains a constant axial position relative to the valve member to move the valve member from the valve closed position to the valve open position, the shroud is prevented from pivotal movement away from the operative position by the lever, preventing access to the cam lock coupling ears.

2. The safety apparatus of claim 1, wherein a lever cradle extends laterally from the shroud, the lever engaging the lever cradle of the shroud when the lever position is pivoted to move the valve member to the valve open position, so that the lever cradle underlies the lever and the shroud is prevented from pivotal movement away from the operative position by the lever, and the lever disengaging from the lever cradle of the shroud when the lever position is pivoted to move the valve member to the valve closed position, so that the shroud pivots freely between the operative and inoperative positions.

3. The safety apparatus of claim 1, wherein the first pivot axis and the second pivot axis are parallel to each other.

4. A method of preventing a cam lock having coupling ears from being unsafely uncoupled from a lever activated rotary motion valve having a tubular outlet to which a hose is coupled, a valve member and a lever secured to the valve member which pivots about a first pivot axis, in a plane, between a lever open pivotal position and a lever closed pivotal position to move the valve member between a valve open and valve closed position, comprising:
    providing a support having a clamp;
    clamping the clamp onto the tubular outlet of the lever activated valve downstream of the valve member;
    pivotally mounting a shroud to the support about a second pivot axis downstream of the first pivot axis for movement between an operative position overlying the tubular outlet to prevent access to cam lock coupling ears and an inoperative position spaced from the tubular outlet enabling access to the cam lock coupling ears, the shroud having a lever cradle;
    attaching ears of a cam lock coupling to the tubular outlet;
    pivoting the shroud to the operative position overlying the tubular outlet to prevent access to cam lock coupling ears; and
    pivoting the lever to move the valve member to the valve open position, the lever engaging the shroud so that the shroud is prevented from pivotal movement away from the operative position by the lever to prevent access to the cam lock coupling ears as long as the valve member remains pivoted to maintain the valve member in the valve open position.

5. The method of claim 4, wherein the first pivot axis and the second pivot axis are parallel to each other.

* * * * *